United States Patent [19]

Yu-Zhong

[11] Patent Number: 4,678,546
[45] Date of Patent: Jul. 7, 1987

[54] PROCESS FOR PROVIDING LITHIUM TANTALUM OXIDE COATED TANTALUM ARTICLES WITH IMPROVED WEAR RESISTANCE

[75] Inventor: Liu Yu-Zhong, Beijing, China

[73] Assignee: North China Research Institute of Electro-Optics, Beijing, China

[21] Appl. No.: 716,803

[22] Filed: Mar. 27, 1985

[51] Int. Cl.$^4$ .............................................. C25D 11/34
[52] U.S. Cl. .................................. 204/32.1; 204/35.1; 204/37.6; 204/39; 204/56.1
[58] Field of Search .................... 204/32.1, 35.1, 37.6, 204/39, 56.1

[56] References Cited

U.S. PATENT DOCUMENTS 4,054,468  10/1977  Honnaker ........................... 148/11.5
4,450,049   5/1984  Nakata et al. ....................... 204/35.1

FOREIGN PATENT DOCUMENTS 59-16633A  5/1984  Japan .

OTHER PUBLICATIONS

F. A. Lowenheim, Electroplating, McGraw-Hill Book Co., New York, 1978, pp. 69–86.
Liu Yuzhong, "LiTaO$_3$ Thin Film and Devices Grown by Electrochemical Reaction", *Kexue Tongbao*, vol. 26, No. 5, pp. 401–405, (May, 1981), (Chinese and English).

*Primary Examiner*—John F. Niebling
*Assistant Examiner*—William T. Leader
*Attorney, Agent, or Firm*—Morgan & Finnegan

[57] ABSTRACT

A process for coating an article made of tantalum niobium or tantalum-niobium alloy with a film containing polycrystalline lithium metal oxide wherein the metal corresponds to the metal from which the article is made. More particularly, the process improves the surface properties including hardness, yield strength, elasticity and electrical properties so that the operating life can be increased and new application for such articles can be made.

It is found that tantalum spinnerets treated in accordance with the process according to the present invention have longer operating life, clog less and produce a better quality fiber.

16 Claims, No Drawings

PROCESS FOR PROVIDING LITHIUM TANTALUM OXIDE COATED TANTALUM ARTICLES WITH IMPROVED WEAR RESISTANCE

INTRODUCTION

The present invention relates to an article of tantalum, niobium or tantalum-niobium alloy provided with a surface film coating of polycrystalline oxygen containing lithium compounds of tantalum, niobium or a mixture of tantalum and niobium to improve the wear resistance and surface performance characteristics of the article. The present invention further provides a process for providing such a film coating on the surface of the article.

BACKGROUND

Tantalum is a rare metal discovered in 1802. However, the metal was not widely used until the beginning of the twentieth century when a carbon reduction process was developed to produce sufficiently pure tantalum. Since then tantalum has been applied extensively in electronic, aerospace, chemical, medical and synthetic fiber industries because it has many desirable properties.

Pure tantalum has a high melting point, good thermal conductivity, excellent chemical stability and corrosion resistance. It is not reactive to air or water; and, except for hydrofluoric acid, tantalum is resistant to corrosive attack by strong acids, including aqua regia. Further, tantalum has low surface hardness and yield strength and can be machined easily. Because of these properties, tantalum has been used to make devices, such as: heaters, reactors, pump parts, valve components and measuring devices for use in highly corrosive environments in the presence of strong acids including hydrochloric acid, nitric acid, sulfuric acid and phosphoric acid. However, because of its low hardness and yield strength, the surfaces of tantalum articles are easily scored and distorted. This leads to a undesirably short operating life.

Many methods have been developed to eliminate this problem. For example, G.B. Pat. No. 702,936 describes heat treating bored tantalum spinnerets in nitrogen or carbon monoxide to improve the surface hardness. However, this treatment also changed the surface of the spinneret leading to increased blockages while spinning. It has also been suggested that the thickness of the spinneret should be increased. However, increased thickness means longer spinning passages and reduced fiber properties. U.S. Pat. No. 4,054,468 describes a process wherein stainless steel or tantalum alloy is bonded explosively to pure tantalum to form a spinneret with better yield strength than a pure tantalum spinneret of the same thickness. These improvements failed to provide a tantalum spinneret to replace the expensive gold-platinum or gold-platinum-rhodium spinneret used in the synthetic fiber industry.

The surface properties of tantalum may be improved by coating with a film of tantalum oxide ($Ta_2O_5$). The tantalum oxide film coating improves further the chemical stability and insulation performance of tantalum. Tantalum articles so coated are useful for high performance capacitors. The tantalum oxide film is formed by anodization of the surface of tantalum metal. However, the maximum thickness of the tantalum oxide film is limited to about 2 $\mu$m, independent of anodization time. Moreover, the breakdown voltage is only about 100 to 200 volts and is unsatisfactory for applications where a higher breakdown voltage resistance is required.

In *Kexue Tongbao*, vol. 26, No. 5, pp. 401–405 (1981), an electrochemical process for preparing lithium tantalum oxide was described. The process provides a simple and useful process for making very thin crystal chips for use as pyroelectric detectors. In this proces, a foil of tantalum, about 2.5 $\mu$m to 5 $\mu$m thick, was placed in molten lithium nitrate. An anodic voltage was applied to form a polycrystalline lithium tantalum oxide chip, about 7 $\mu$m to 14.5 $\mu$m thick, wherein the crystals have a preferred orientation.

None of these methods provide tantalum articles with sufficiently improve wear resistance and surface electrical properties.

It is, therefore, an objective of the present invention to provide tantalum articles with improved surface performance, including hardness, yield strength, elasticity, high voltage breakdown resistance and other desired physical properties.

Since the same problems exist with niobium and tantalum-niobium alloy articles, it is also an objective of the present invention to provide a method to improve the surface performance of niobium and niobium-tantalum alloy articles. A further objective is to provide a process by which the tantalum, niobium and tantalum-niobium alloy articles with improved surface properties can be made.

BRIEF SUMMARY OF THE INVENTION

According to the present invention an article of tantalum, niobium or tantalum-niobium alloy is provided with a rigid, thick film of polycrystalline oxygen containing lithium compounds of tantalum, niobium or their mixture respectively. Such articles have improved surface properties including improved wear resistance, yield strength, voltage breakdown resistance and improved elasticity. In the case of a tantalum article, the rigid, thick film of polycrystalline oxygen containing lithium compounds comprises a layer of lithium tantalum oxide in a preferred [110] crystal orientation on the outside and a layer of tantalum oxide on the inside bonded to the tantalum article. The structure of the film is similar, in the case of niobium or niobium-tantalum alloy articles except that tantalum is replaced with niobium or a mixture of tantalum and niobium.

The present invention further provides a process for coating an article made of tantalum, niobium or tantalum-niobium alloy with a film of polycrystalline oxygen containing lithium compounds of, respectively, tantalum, or niobium or their mixture, the method comprising:

(a) cleaning the surfaces of the article to remove impurities;

(b) immersing the cleaned article into a bath of molten inorganic salt selected from the group consisting of lithium nitrate, a mixture of lithium nitrate and potassium nitrate and a mixture of lithium nitrate and lithium hydroxide at a temperature in the range of about 400° C. to 580° C.;

(c) Applying to the article an anodic voltage in the range of about 3 to 50 volts at a current density in the range of about 2 to 20 mA/cm$^2$ for a period of about 0.1 to 10 hours; and (d) post-treating the article to condition the article.

The treated tantalum article has a Vickers diamond hardness of HV 700, improved elasticity, strength, distortion resistance and a much longer operating life.

When a tantalum spinneret, treated in accordance to the present invention, is used, not only is the operating life increased, surprisingly, the quality of the spinned fiber is also improved. Further, tantalum wires or foils treated in accordance to the present invention are useful as elastic or spring elements.

It has further been found that the films formed on the surface of the tantalum article is a good insulator and has high voltage breakdown resistance and can, therefore, be used as a thin film thermal detector.

DETAILED DESCRIPTION OF THE INVENTION

The process according to the present invention comprises:

(a) cleaning the surface of the metal article to remove dust, oil, and impurities;
(b) immersing the cleaned article into a bath of molten oxygen containing inorganic salt of lithium at temperatures of about 400° C. to 580° C.;
(c) applying to the article an anodic voltage in the range of about 3 to 50 volts at a current density of about 2 to 20 mA/cm$^2$ for a period of about 0.1 to 10 hours to produce a fiom coating; and
(d) post treating the coated article.

The article may be cleaned by conventional methods including dusting and washing with oil removing solvents such as acetone. The article may also be soaked in strong acid to remove imbedded impurities present in the surface of the metal article. These impurities are imbedded into the tantalum surface usually as a result of machining. During electric spark machining, cutting, extruding and other like processing, localized high temperature spots are generated. The high temperature spots may cause metal impurities from processing tools to be bonded to or even form an alloy with tantalum. These impurities are difficult to remove even by soaking in strong acids.

In such circumstances, further etching with hydrofluoric acid including electro-chemical etching is necessary to produce a thick, rigid film on the surface of tantalum without cracking or shedding of the film. The speed of etching varies with the impurities present in the tantalum article and the etching conditions used. All other conditions being the same, the amount of etching depends on the etching time. When completed, the surface of the etched article becomes smooth and has a high finish. Further, etching can be used to enlarge the diameter of the bores in a spinneret.

An example of a suitable etching solution consists of a 10:10:35 by volume mixture of concentrated hydrofluoric acid (40% by weight), concentrated nitric acid (65% by weight), and distilled water. A tantalum spinneret was treated in this etching solution at 39° C. with an applied anodic voltage of 2.5 volts for 7 minutes. The results show that all surface impurities have been removed and the average diameter of the bores was enlarged by about 2 $\mu$m.

The molten oxygen containing inorganic lithium salt may be lithium nitrate, a mixture of lithium nitrate and potassium nitrate or a mixture of lithium nitrate and lithium hydroxide. Pure lithium nitrate shows a high degree of activity in the electrochemical reaction step. The addition of potassium nitrate to lithium nitrate lowers the melting point of lithium nitrate and increases the flashing voltage of the melt so that a higher voltage may be applied in the electrochemical reaction step. The addition of lithium hydroxide to lithium nitrate permits the use of a higher temperature in the electrochemical reaction step.

The conditions of the electrochemical reaction may be varied to meet different requirements.

If the temperature is increased, the degree of preferred orientation of the [110] plane of the polycrystalline lithium tantalum oxide containing film decreases and the surface characteristics of tantalum is modified to a greater degree. If the applied voltage is increased, the rate of film formation increases, the degree of perferred orientation of polycrystalline lithium tantalum oxide containing film increases. The resulting film is also more compact and has better insultating properties.

The maximum voltage is limited by the purity of the tantalum metal and the flashing voltage of the melt, which voltage decreases as the temperature of the melt is increased. All other conditions being the same, the thickness of the film formed is directly proportional to the time of the electrochemical reaction.

It is noted that for a set temperature, the applied current density must be sufficiently high. If the current density is below that required, the rate of the electrochemical reaction is very slow and consequently, the rate of film formation is very slow. If the current density is too high; however, there are localized increases in temperature and this presents a problem in controlling the temperature of the electrochemical reaction. It has been found that the following conditions are suitable for treating tantalum articles: the temperature of the melt should be in the range of about 400° C. to 580° C., the applied anodic voltage should be about 3 volts to 50 volts and the current density should be between about 2 to 20 mA/cm$^2$.

If higher melt temperatures are used, it has been found that no anodic voltage need be applied and a film will form as a result of chemical reaction alone. However, the rate is very slow. Further, there are many defects in the lattice of the polycrystals and the polycrystals are not oriented.

X-ray analysis of the electrochemical process shows that tantalum is first converted to polycrystalline tantalum oxide and then to polycrystalline lithium tantalum oxide. As long as there is pure tantalum, the conversion of tantalum oxide to lithium tantalum oxide is not complete. A phase diagram can be drawn to represent the tantalum-tantalum oxide-lithium tantalum oxide system.

Except for edges and corners, the film formed from the electrochemical reaction is uniform on the various surfaces of the article including the inner surfaces of the bores of a spinneret. However, the edges and corners have slightly inferior insulating properties compared with the other surfaces of the film covered article.

In a preferred embodiment, the temperature of the melt is controlled first at above about 500° C., the applied anodic voltage at about 3 volts to 35 volts for about 1 to 3 hours to produce a relatively thick film. The reaction condition is then changed: the temperature of the melt is lowered to about 420° C. to 460° C., the applied anodic voltage is increased to about 35 volts to 45 volts for about 2 to 4 hours. This produces a relatively thin film with a high degree of packing and preferred orientation.

The above process is useful for producing a film having very high electrical resistance of $3 \times 10^{11}$ ohm-cm, and very high voltage breakdown resistance of above 800 volts.

Alternatively, the reaction conditions employed may be: a temperature of about 420° C. to 460° C., an applied anodic voltage of about 35 volts to 45 volts for about 2 to 4 hours and then increasing the temperature to above about 500° C., decreasing the applied voltage to about 10 volts to 35 volts for about 1 to 3 hours.

The above process is useful for producing a film having very high electrical resistance, $6 \times 10^{11}$ ohm-cm, and very high voltage breakdown resistance, above 950 volts.

The reaction conditions may also be repeatedly alternated to produce multilayer films.

After electrochemical treatment, the article should be cleaned and post-treated to eliminate any imbalance in electrical loading in the film coating. This may be by aging it at a temperature of about 170° C. to 400° C. for about 1 to 4 hours. The temperature may be maintained in the range of 170° C. to 250° C.

Or, if the film is to be used for insulation purposes, the film coated article may be placed in a phosphoric acid solution under an applied voltage for a period of time. For example, the film coated article may be placed in a 1:2 mixture by volume of dilute phosphoric acid (0.05% by weight) and ethylene glycol at a temperature of about 95° C.±5° C. and an applied anodic voltage of about 500 volts to 600 volts for about 1 to 3 hours. Alternatively, the film coated article may be placed in dilute phosphoric acid (0.01% by weight) at room temperature and an applied anodic voltage of about 350 volts to about 600 volts for a time of at least 0.5 hours, such as for about one hour. The post-treatment steps may also be a combination of the above steps.

After post-treatment, the film is firmly bonded to the surface of the tantalum article.

Articles treated in accordance with the present invention have significantly improved surface hardness. For comparison purposes, pure tantalum has a surface hardness of about 120 to 140 HV, after heat treatment in nitrogen and carbon monoxide by a known process according to G.B. Pat. No. 702,936, the surface hardness is about 300 HV. Tantalum articles treated in accordance with the present invention has a maximum surface hardness of above about 700 HV. If the film coating is removed by grinding and polishing, the hardness of the underlying tantalum layer is found to be increased to about 400 to 500 HV. Even after further grinding of the tantalum article, the surface hardness is higher than unprocessed tantalum.

It is also found that film coated tantalum metal treated according to the present invention has increased elasticity, yield strength and decreased ductility. It is evident that the tantalum layer is altered by the process. The thickness of this altered layer depends on the reaction conditions.

A tantalum foil with a thickness of 0.1 mm was treated at 520° C. in lithium nitrate and an anodic voltage of 10 volts for one hour. The eleasticity of the treated foil was compared with untreated tantalum foil. The results are presented in Table I below.

TABLE I

| | ELASTICITY | | | |
|---|---|---|---|---|
| | $\sigma$ 0.002[a] | $\sigma$ 0.005[a] | Hy %[b] | Af %[c] |
| Processed Tantalum foil | 119 | 140 | 0.64 | 0.07 |
| Unprocessed Tantalum foil | 48 | 54 | 1.06 | 0.08 |

[a] $\sigma$ 0.002 and $\sigma$ 0.005 = ultimate elasticity in Kg/mm$^2$.
[b] Hy = elastic hysteresis
[c] Af = elastic after-effect
Both Hy and Af were measured at a maximum stress of 47 Kg/mm$^2$.

The dielectric constant of the film coating varies with the reaction conditions, usually in the range of about 25 to 35. The resistivity of the film coating is from about $10^{11}$ to $10^{13}$ ohm-cm. The loss in resistivity decreases with increase in frequency and is similar to single crystal lithium tantalum oxide. This is desirable for the production of high frequency low loss capacitors.

At room temperature, the breakdown voltage of a 15 $\mu$m film is in the range of about 600–800 volts. In a multilayered film produced as described hereinabove, the breakdown voltage can reach 1500 volts.

It is further observed that the electropotential is altered after the tantalum surface is coated with a film in accordance with the present invention. For example, in a coagulation bath solution for spinning rayon staple, wherein the solution contain 124.3 g/l of $H_2SO_4$, 13.2 g/l of $ZnSO_4$ and 333.2 g/l of $Na_2SO_4$, an unprocessed tantalum spinneret is electronegative. However, a tantalum spinneret processed in accordance with the present invention is electropositive. The potential varies with the processing conditions and the difference may be as high as +0.25 volts.

Tantalum spinnerets processed in accordance to the present invention shows improved wear resistance to scoring and distortion. Further, when the difference in temperature between the coagulation solution and the spinning solution is high, the increased insulation provided by the film coating improves the spinning process. Moreover, the film on the exit side of the spinneret can be ground away to expose pure tantalum. The difference in electropotential of coated and uncoated tantalum significantly reduces the rate of clogging of the capillary bores during spinning.

A tantalum spinneret was treated in molten lithium nitrate at 520° C., at an anodic voltage of 15 volts for 2 hours. The film coating on the exit side of the spinneret was removed by grinding and polishing. This spinneret was used to spin rayon staple. Compared to an unprocessed tantalum spinneret, which had 180 clogged bores after 34 hours of spinning, the processed tantalum spinneret has only one clogged bore. Moreover, the breakdown strength of the fiber spunned by the processed tantalum spinneret was improved. The breakdown strength of fiber produced by an unprocessed tantalum spinneret was 2.6 g/denier. Whereas, the breakdown strength of fiber produced by the processed tantalum spinneret was 2.8 g/denier.

It is known that pure tantalum has poor elasticity and cannot be used to make an elastic element. However, if tantalum foil or wire is formed into a desired shape and processed according to the present invention, the elasticity of the tantalum article is increased and can be used as an elastic element in strong acids at high temperatures.

Tantalum metal is an excellent x-ray absorber and should be considered for use as an x-ray sensor. However, tantalum coated with tantalum oxide according to known methods, is not suitable as a sensing element because the voltage breakdown resistance is less than 250 volts and thermal conductivity is poor. Tantalum foil processed in accordance with the present invention to have a thin film coating does have excellent voltage breakdown resistance and good thermal conductivity; therefore, it is suitable for use as a x-ray sensing element. The film coated tantalum sensing element has been found to have rapid response and is useful for measuring high dosages.

Tantalum foils processed in accordance with the present invention are also useful for making high voltage, high frequency capacitors.

Niobium is also a rare metal having properties similar to tantalum. The film forming process of the present invention is also suitable for niobium. Generally, the anodic voltage required is lower, the current density required is higher and the rate of film formation is faster.

The temperature of the molten lithium salt employed is similar to that used for processing tantalum. A suitable temperature range is about 440° C. to 520° C. The anodic voltage applied is in the range of about 5 volts to 10 volts and the current density required is above 20 mA/cm$^2$.

The conditions for processing tantalum niobium alloy articles can be varied in accordance with the ratio of tantalum to niobium.

The following examples illustrates the present invention.

EXAMPLE 1

A tantalum spinneret for spinning rayon staple, having a diameter of 64 mm and 7500 capillary bores of 0.104±0.004 mm diameter, was washed with acetone to remove oil and soaked in a solution of 20 g $K_2Cr_2O_7$, 360 ml sulfonic acid (98% by weight) and 40 ml water at 90° C. for 30 minutes.

After cleaning and drying the spinneret was placed in an etching solution consisting of a solution of 10 volumes of 40% by weight hydrofluoric acid, 10 volumes of 65% by weight nitric acid and 35 volumes of water. The temperature of the solution was controlled at 39° C.±1° C. With a piece of platinum as cathode, an anodic voltage of 2.5 volts was applied and the etching reaction was allowed to proceed for 7 minutes.

The cleaned and etched spinneret was immersed in a melt of lithium nitrate at a temperature of 520° C. An increasing anodic voltage of up to 15 volts was applied to maintain a constant current density of 5 mA/cm$^2$ for 2 hours until a white film had formed on the surface of the spinneret.

The film coated spinneret was cleaned and dried. The film on the exit face of the spinneret was ground away and polished to expose tantalum metal. The spinneret was then heat treated at a temperature of 170° C. for 3 hours.

The hardness of the film was about 700 HV. The hardness of the exposed tantalum metal varied from 400 HV to 600 HV. Because of the thickness of the film the average diameter of the bores was 0.100 mm±0.004 mm. The spinneret can be used directly for spinning rayon staple.

EXAMPLE 2

Tantalum wire with a diameter of 1 mm was formed into a spiral, degreased with acetone, and soaked as described in Example 1 for 30 minutes. After washing and drying, it was etched electrochemically for 10 minutes using the method described in Example 1.

The tantalum spiral was washed and dried and immersed in a melt of lithium nitrate at 520° C. An anodic voltage was applied and increased to 20 volts to maintain a constant current density of 5 mA/cm$^2$ for 3 hours. The tantalum spiral was found to be useful as an elastic element and can be used in all strong acids except hydrofluoric acid.

EXAMPLE 3

A 0.15 mm thick tantalum sheet was made into discs, each having a diameter of 20 mm. A small tail was left on each disc as a lead for spot welding. The discs were cleaned, soaked and etched as described in Example 1. These discs were then annealed in high vacuum at 2000° C. for 30 minutes. The leads were welded.

The discs were then placed in a melt of lithium nitrate at 520° C. Maintaining a constant current density of 10 mA/cm$^2$, an anodic voltage was applied and increased to 20 volts and kept at 20 volts for 2 hours.

Afterwards, the discs were immersed in a melt of 50:50 by weight lithium nitrate and potassium nitrate at a temperature of 440° C. An anodic voltage increasing to 40 volts at a constant current density of 5 mA/cm$^2$ was applied for 3 hours.

The discs were removed from the bath and washed. One side of each disc was then coated with hydrofluoric acid resistant paraffin wax. Each of the discs coated on one side with paraffin wax was then immersed in an etching solution as described in Example 1 until the film on the other side which was not coated with paraffin wax was totally dissolved away, exposing tantalum metal.

The discs were removed from the etching solution and washed and again immersed in a melt of lithium nitrate at 520° C. An increasing anode voltage of up to 15 volts was applied at a current density of 10 mA/cm$^2$, after which the voltage was held at 15 volts for 10 minutes. The discs were removed and placed in a second lithium nitrate bath at 440° C. An anodic voltage of 30 volts was applied at a constant current density of 5 mA/cm$^2$ for 2 hours.

After the discs were washed they were immersed in a solution of 0.01% by weight of phosphoric acid with an applied anodic voltage of 350 volts for 30 minutes. The leads on the discs were removed and the film coated discs cleaned and dried. Each disc was coated with a thin film one one face and a thick film on the other face and was found to be useful as a substrate for a sensor of high dosage x-ray.

EXAMPLE 4

A tantalum sheet, 0.1 mm thick, was cut into a square, 10 mm×10 mm, except for a small tail which was left on the square as a lead for spot welding.

The square was cleaned, soaked and etched as described in Example 1. It was then immersed in a melt of lithium nitrate at 440° C. An anodic voltage was applied and increased to 40 volts, maintaining a constant current density of 5 mA/cm$^2$, and the voltage of 40 volts was maintained for 3 hours.

Then the square was placed in melt of lithium nitrate at 520° C. with an applied anodic voltage of 30 volts at a constant current density of 10 mA/cm$^2$ for 2 hours.

The square was again treated in a lithium nitrate bath at 440° C., with an applied anodic voltage of 40 volts at a constant current density of 5 mA/cm$^2$ for 3 hours.

After this, the square was washed and placed in a solutin of one volume of 0.05% by weight phosphoric acid and two volumes of ethylene glycol at 95° C. at a constant anodic voltage of 600 volts for one hour. After washing with boiling water, it was placed in 0.01% by weight phosphoric acid at room temperature at a constant applied anodic voltage of 400 volts for 30 minutes.

After cleaning and drying, a nickel-chromium-gold alloy electrode was deposited on one surface of the film coating of the square. The square was then heat treated at 170° C. for 3 hours. The thickness of the film coating was about 19 $\mu$m. The square was found to have high voltage breakdown resistance and low loss at high frequencies and was found to be suitable for use as a capacitor. At room temperature, the breakdown voltage was over 1000 volts. At room temperature and at a measured frequency of 1000 HZ, the loss was $10 \times 10^{-3}$; at 200 k-HZ, the loss was $6 \times 10^{-3}$; and 1M-HZ, the loss was $4.6 \times 10^{-3}$.

What is claimed is:

1. A process for making an article made of a metal selected from the group consisting of tantalum, niobium and an alloy of tantalum and niobium coated with a film comprising polycrystalline lithium-containing metal oxide, the process comprising:
   (a) cleaning the surface of the metal article to remove surface impurities by:
      (i) washing with an organic solvent;
      (ii) etching with a solution of a strong acid selected from the group consisting of hydrofluoric acid and a mixture of hydrofluoric acid and nitric acid under an applied anodic voltage; or
      (iii) a combination of the above;
   (b) immersing the cleaned article in a bath of an oxygen containing inorganic salt of lithium at a high temperature in the range of 400° C. to b 580° C., and applying an anodic voltage in the range of about 3 to 50 volts to maintain a current density of about 2 to 20 mA/cm$^2$ for a period of about 0.1 to 10 hours to form said film on the surface of the article; and
   (c) post-treating the article by:
      (i) aging at a temperature of about 170° C. to 400° C. for about 1 to 4 hours;
      (ii) immersing the article in a solution of about 0.05% by weight of phosphoric acid and ethylene glycol at a temperature of about 90° C. to 100° C. and applying anodic voltage of about 500 volts to 600 volts for about 1 to 3 hours;
      (iii) immersing in dilute phosphoric acid at room temperature and applying an anodic voltage of about 350 volts to about 600 volts for at least 0.5 hours; or
      (iv) a combination of the above steps.

2. A process according to claim 1 wherein the lithium-containing metal oxide is selected from the group consisting of lithium tantalum oxide, lithium niobium oxide and a mixture thereof.

3. A processing according to claim 1 wherein step (a) comprises electrochemical etching in a solution of hydrofluric acid at an applied anodic voltage of about 2.5 volts to remove a surface layer of the metal body.

4. A process according to claim 1 wherein the oxygen containing inorganic salt of lithium is selected from the group consisting of lithium nitrate, a mixture of lithium nitrate and potassium nitrate and a mixture of lithium nitrate and lithium hydroxide.

5. A process according to claim 4 wherein the oxygen containing inorganic salt of lithium is lithium nitrate and the temperature is in the range of 420° C. to 580° C.

6. A process according to claim 1, wherein in step (b) the temperature of the melt is first controlled at above 500° C. and an applied anodic voltage in the range of about 3 volts to 35 volts is applied for about 1 to 3 hours; the temperature of the melt is then controlled at a temperature in the range of 420° C. to 460° C. and an applied voltage in the range of about 35 volts to 45 volts is applied to form the outer portion of the film.

7. A process according to claim 2 wherein in step (b) the temperature of the melt is first controlled at about 410° C. to 460° C. and an applied anodic voltage in the range of about 35 volts to 45 volts is applied for about 2 to 4 hours and then the temperature of the bath is controlled at a temperature about 500° C., and an applied anodic voltage in the range of about 3 volts to 35 volts is applied to form the outer portion of the film.

8. A process according to claim 1 wherein in step (c) the post treatment is carried out by procedure (iii) and an anodic voltage of about 350 volts is applied for about one hour.

9. A process according to claim 1 wherein in step (c) the post treatment is carried out by procedure (i) and the temperature during aging is maintained at about 170° C. to 250° C.

10. A process according to claim 1 wherein in step (c) the post treatment is carried out by procedure (ii) and the temperature is maintained at about 95° C.

11. A process according to claim 1 wherein the metal article is a spinneret made of tantalum and, wherein step (a) further comprises electro-chemical etching of the surface of the tantalum spinneret by immersing the spinneret in a solution containing hydrofluoric acid with an applied anodic voltage to remove a surface layer and enlarge the diameter of the capillary bores in the spinnent and wherein in step (b) the temperature of the melt is in the range of about 420° C. to 580° C., and the applied anodic voltage is in the range of about 3 volts to 40 volts.

12. A process according to claim 11 further comprising the step of removing the film coating on the exit side of the spinneret to expose tantalum metal.

13. A process according to claim 1 wherein the article is made of tantalum.

14. A process according to claim 13 wherein the film-coated tantalum metal has increased elasticity compared to noncoated tantalum.

15. A process according to claim 14 wherein the article is a polar plate of a capacitor.

16. A process according to claim 14 wherein the article is a substrate of an x-ray sensing element or a heat sensing element.

* * * * *